United States Patent Office 3,056,844
Patented Oct. 2, 1962

3,056,844
PROCESS FOR THE PRODUCTION OF CYCLODODECENE
Walter Stumpf, Marl, Kreis Recklinghausen, Germany, assignor to Chemische Werke Huls Aktiengesellschaft, Marl, Kreis Recklinghausen, Germany, a corporation of Germany
No Drawing. Filed Sept. 19, 1960, Ser. No. 56,645
Claims priority, application Germany Dec. 21, 1959
3 Claims. (Cl. 260—666)

It is known that cyclododecene can be made by the partial hydrogenation of cyclododecatriene-(1,5,9). The isolation of the pure compound is however made difficult by the fact that it has not been possible heretofore to devise a satisfactory method for the separation of the by-products of the hydrogenation.

It has now been found that cyclododecene can be made advantageously by chlorinating cyclododecane to monochlorocyclododecane and then splitting off hydrogen chloride. The chlorination suitably is carried out in the presence of a solvent to a conversion of up to about 60% and the splitting off of the hydrogen chloride suitably is carried out in the presence of a catalyst.

The cyclododecane starting material may be made by the complete hydrogenation of cyclododecatriene-(1,5,9).

The cyclododecane is chlorinated without a catalyst and without light, suitably in the presence of an inert solvent such as chloroform, carbon tetrachloride or tetrachloroethane, at a temperature within the range from 30° C. to 110° C. or higher but preferably within the range from 40° C. to 70° C. For example a brisk stream of chlorine is introduced through a porous plate into a solution of cyclododecane in carbon tetrachloride. The chlorine is introduced at such a rate that it does not pass through the column of liquid but is completely absorbed. Hydrogen chloride escapes briskly at the top of the apparatus and may be recovered as strong hydrochloric acid solution by absorption in water in a washing tower or led away directly to some other use. Since the monochlorocyclododecane tends to chlorinate further the chlorination must be limited. The best value is about 75–80% of the amount of chlorine gas theoretically required for a complete conversion to monochlorocyclododecane, that is, from .75 to .80 mol of chlorine per mol of cyclododecane. With this ratio of chlorine to cyclododecane the conversion will be about 55–60%. The monochlorocyclododecane is recovered after distillation of the solvent by fractional distillation of the degassed chlorination mixture in vacuum. In order to avoid discoloration the distillation suitably is carried out in an apparatus the surface of which and the filling bodies consist of glass, porcelain, stoneware, enamel or a metal which is completely inert to hydrogen chloride and the chlorination products. The distilling column suitably is filled with Raschig rings. Thus pure monochlorocyclododecane can be obtained in a single distillation. The unreacted cyclododecane is distilled off first. In this phase of the distillation the column head must be at from 65 to 80° C. in order to maintain the cyclododecane in the liquid state. The so-recovered cyclododecane can be used directly in the next chlorination. The monochlorocyclododecane comes over as the second fraction at a constant boiling point. The distillation residue consists of more highly chlorinated cyclododecane, principally the dichlorocyclododecane.

The monochlorocyclododecane produced as described above is so pure that it can be used directly for the pyrolytic splitting off of the hydrogen chloride. The splitting off of the chloride takes place without a catalyst at high temperature but it may be carried out more expeditiously in the presence of a catalyst at a substantially lower temperature. All substances which are capable of activating halogen in organic compounds are capable of use as catalysts, for example salts of aluminum, the alkali metals, the alkaline earth metals, zinc, copper, nickel, manganese and iron. The halogenides are especially suitable but the sulfates and nitrates also are useful. Even such stable compounds as calcined aluminum oxide may be used. The most suitable materials are ferrous chloride and iron turnings. Of the iron-containing alloys, steels having a high iron content, i.e. more than 98%, surpass all other catalysts in activity. The yield with such alloys is substantially quantitative.

The catalyst may be used in quantities within the range from 0.1 to 5%, preferably 0.5 to 1% based upon the weight of the monochlorocyclododecane. The cyclododecene distills slowly as soon as the temperature reaches 180° C. The most suitable temperature is within the range from 240° C. to 260° C. At higher temperatures the yield gradually decreases due to tar formation. The temperature varies insignificantly with different catalysts. Instead of operating the process batchwise the splitting off of the hydrogen chloride may be carried out continuously for instance by introducing the monochlorocyclododecane dropwise into a tube filled with steel turnings and heated to from 240° to 260° C. The best temperature for this operation is 250° C. Or the monochlorocyclododecane may be vaporized and the vapors introduced into the tube. The hydrogen chloride liberated preferably is drawn off at the top of the apparatus but it may be drawn off at the lower end. The crude product which flows out of the tube is degassed while still warm and is then purified by distillation. The crude product is free of starting material. The distillation of the product leaves a small residue which at the beginning amounts to from 5 to 7%. The distillation suitably is carried out in vacuum.

The cyclododecene can be oxidized as a cyclic olefine to n-decane-1:10-dicarboxylic acid which is useful for the production of polyesters.

The invention is further described and illustrated by the following specific example.

10 kg. (59.5 mol) of crystalline cyclododecane is dissolved in 12 l. of carbon tetrachloride and chlorinated at 60° C. by placing the solution in a cylindrical vessel having a porous bottom through which chlorine is introduced at the rate of 266 l. per hour. The evolved hydrogen chloride is caught in a washing tower with water. After about 4½ hours 75 to 80% of the calculated quantity of chlorine required for complete conversion of the cyclododecane to monochlorocyclododecane is introduced. The supply of chlorine is then stopped and the reaction mixture is freed of hydrogen chloride by passing nitrogen through it. The solvent is then distilled out of the reaction mixture at a pressure at the end of the distillation of 40 Torr. The remainder of the reaction mixture, after removal of the solvent, is fractionally distilled in a column having 20 shelves and a reflux ratio of 1 to 10 at 0.5 Torr. The head of the column and the bridge as well as the cooler are heated to 80° C. in order to be able to remove the cyclododecane as a liquid. From 4 to 4.5 kg., average 4.3 kg., of cyclododecane is recovered. The conversion is from 55 to 60%. The second fraction from the column is pure monochlorocyclododecane, B.P.$_{0.5}$:84° C., $d_4^{20}$, 0.983, $n_D^{20}$:1.4905. The yield is 3.7 kg. (18.25 mol) or 53% of the theoretical yield based upon the conversion. The third fraction from the column consists of from 3 to 3.2 kg. of more highly chlorinated cyclododecane and consists principally of dichlorocyclododecanes.

The monochlorocyclododecane is dropped at the rate of 94.3 g. per hour into an oven which is 4 cm. in diameter and 2.3 m. high and is filled with iron turnings (98% Fe content) and heated to 250° C. The hydrogen chloride liberated is taken off at the top of the oven through a cooler. In 160 hours 15.35 l. (=15.106 kg.) of monochlorocyclododecane and 11.89 kg. of cyclododecene (calc. 12.39 kg.) amounting to 96% of the theoretical yield (based upon complete conversion) pass over. By vacuum distillation 1.597 kg. of crude cyclododecene gives 120 g. of distillation residue and 1.477 kg. of pure cyclododecene (92.5% of theory) B.P.$_{20}$:117° C., $d_4^{20}$:0.871, $n_D^{20}$:1.4842. Similar yields of cyclododecene are obtained by using iron-(II)-chloride or aluminum chloride as a catalyst to split off hydrogen chloride.

I claim:

1. Process for the production of cyclododecene which comprises chlorinating cyclododecane to monochlorocyclododecane in the presence of a catalyst of the group consisting of metallic iron and steel, having an iron content of at least 98% to split off hydrogen chloride therefrom.

2. Process as defined in claim 1 in which the chlorination of the cyclododecane is carried out in the presence of an inert solvent at a temperature within the range from 30° to 110° C. to a conversion of up to about 60% and the monochlorocyclododecane is recovered from the resulting reaction mixture by distillation.

3. Process as defined in claim 1 in which the monochlorocyclododecane is dehydrohalogenated by heating it to from 240–260° C. in the presence of a dehydrohalogenation catalyst.

References Cited in the file of this patent

UNITED STATES PATENTS

| | | |
|---|---|---|
| 2,324,249 | Vaughan et al. | July 13, 1943 |
| 2,899,473 | Leprince et al. | Aug. 11, 1959 |

UNITED STATES PATENT OFFICE
CERTIFICATE OF CORRECTION

Patent No. 3,056,844 October 2, 1962
Walter Stumpf

It is hereby certified that error appears in the above numbered patent requiring correction and that the said Letters Patent should read as corrected below.

Column 3, line 12, before "in" insert -- and heating the monochlorocyclododecane --.

Signed and sealed this 5th day of February 1963.

(SEAL)
Attest:

ERNEST W. SWIDER
Attesting Officer

DAVID L. LADD
Commissioner of Patents